US009026986B2

(12) United States Patent  (10) Patent No.: US 9,026,986 B2
Collinson  (45) Date of Patent: May 5, 2015

(54) PROCESS FOR DEVELOPMENT OF MONITORING TOOLS

(75) Inventor: John P Collinson, Newcastle Upon Tyne (GB)

(73) Assignee: Optimized Systems and Solutions Limited, Derby (GB)

( * ) Notice: Subject to any disclaimer, the term of this patent is extended or adjusted under 35 U.S.C. 154(b) by 174 days.

(21) Appl. No.: 13/384,693

(22) PCT Filed: Jul. 2, 2010

(86) PCT No.: PCT/EP2010/059448
§ 371 (c)(1),
(2), (4) Date: Jan. 23, 2012

(87) PCT Pub. No.: WO2011/009703
PCT Pub. Date: Jan. 27, 2011

(65) Prior Publication Data
US 2012/0324420 A1  Dec. 20, 2012

(30) Foreign Application Priority Data
Jul. 24, 2009 (GB) .................................. 0912844.8

(51) Int. Cl.
*G06F 9/44* (2006.01)
*G05B 17/02* (2006.01)
(52) U.S. Cl.
CPC *G05B 17/02* (2013.01); *G06F 8/10* (2013.01); *G06F 8/35* (2013.01)
(58) Field of Classification Search
None
See application file for complete search history.

(56) References Cited

U.S. PATENT DOCUMENTS

2004/0243636 A1* 12/2004 Hasiewicz et al. ......... 707/104.1
2005/0137840 A1   6/2005 Peck et al.
2008/0098349 A1   4/2008 Lin et al.

FOREIGN PATENT DOCUMENTS

WO  WO 00/73885 A1  12/2000

OTHER PUBLICATIONS

Oct. 7, 2010 International Search Report issued in International Application No. PCT/EP2010/059448.
Nov. 23, 2009 British Search Report issued in British Application No. GB0912844.8.
Oct. 7, 2010 Written Opinion of the International Searching Authority issued in Application No. PCT/EP2010/059448.

* cited by examiner

*Primary Examiner* — Chuck Kendall
(74) *Attorney, Agent, or Firm* — Oliff PLC (57) ABSTRACT

A process for creation of an equipment health monitoring (EHM) tool, including defining functional requirements for a proposed EHM tool in a structured hierarchical format. The functional requirements definition is used to generate an outline model for a plurality of functions of the proposed EHM tool according to a model template, wherein the outline model is captured as one or more graphical representations. Each graphical representation includes at least one component representative of a defined EHM functional requirement. Source code for the proposed EHM tool is automatically generated based upon the graphically represented model and then compiled to create a deployable EHM tool from the source code by applying a compilation strategy dependent on an intended mode of operation for said EHM tool. An EHM generation tool and associated data carrier are also recited.

25 Claims, 9 Drawing Sheets

PROCESS FOR DEVELOPMENT OF MONITORING TOOLS

The present invention relates to monitoring tools and more particularly, although not exclusively, to the creation and deployment of tools for monitoring operational equipment or systems.

Operational equipment, such as machinery, often represents a significant investment for the machine operator. In such circumstances the operational state of the machinery can have a significant impact on the safety of people associated therewith and also on the operator's business. For these reasons it is known to monitor the operational condition or health of such machinery such that servicing, maintenance or repair work can be scheduled as appropriate in order to avoid unforeseen operational problems.

Gas turbine engines represent an example of such machinery, in which a significant investment is made by an operator. Gas turbine engines are used in a variety of applications, including propulsion for aerospace and marine applications and drive systems within power generation and oil and gas industries. Whilst the following description proceeds in relation to engine health monitoring (EHM) tools for aircraft, it will be appreciated that the problems and solutions described herein may be applied to a variety of applications in which gas turbine engines or other forms of complex machinery or systems are used.

Commercially available tools for monitoring engine health, such as those used by airlines, typically allow some degree of customisation such that the end user can configure models and analysis methodologies using a graphical user interface to suit their own operational setup. However such tools require the tailored EHM algorithms to be used within that tool. This significantly limits the applicability of those tools, often resulting in the tools being limited to use on a remote server system rather than being integrated or embedded applications.

Furthermore, it is a requirement that tools be certified for use within a high integrity environment. Customised tools of the type described above are unlikely to be suitable for certification. In addition, those tools are typically accompanied by separate documentation detailing information such as requirements tracking and testing.

As an alternative to such commercially available tools, it is possible to undertake manual coding of the required algorithms using a widely recognised high level programming language. However such a tool may not be suitable for a high integrity environment dependent on the programming language used. In addition, manual development of code requires implementation by a software engineer. Such specific skills are separate from the skills required to devise the system for monitoring a gas turbine engine and accordingly a multi-discipline team is typically required to create such a tool. This type of approach has been found to lead to widely varying coding of tools which can be difficult to interpret and which are therefore difficult to update or modify.

Accordingly such bespoke tools are typically also only suitable for use on a remote or back office server system. This type of tool is therefore generally suitable for use only retrospectively to receive pre-recorded engine operational data which is sent to the remote server for retrospective analysis. Whilst this capability does allow an operator or monitoring centre to review the engine operation, the inherent time delay and potential for communication problems or failures renders this solution far from ideal.

The need for real time and/or embedded monitoring capabilities has been acknowledged and such tools proposed. However the development of a tool specifically for this purpose has been found to prohibit use of that tool for remote server applications. Furthermore the creation of such tools is typically subject to the multi-disciplinary requirement described above and can result in tools which are inherently difficult to interpret or modify. This tends away from 'out of the box' functionality which is typically required for a tool to be adopted by a broad range of users.

It is an object of the present invention to provide for development of monitoring tools which are adaptable, whilst also being deployable within differing operational environments.

The invention has derived from a fundamental determination by the inventor that the process used for development of monitoring tools significantly impacts on the applicability of the tool to specific uses. Accordingly it has been found that the prescribing of tool structure, templates and/or interfaces during development can lead to an improved and/or more widely applicable monitoring tool.

According to one aspect of the present invention, there is provided a process for creation of an equipment health monitoring (EHM) tool, comprising: providing definition of functional requirements for a proposed EHM tool in a structured hierarchical format; generating an outline model for a plurality of functions of the proposed EHM tool according to a model template, including at least one graphical component representative of a defined EHM functional requirement; generating source code for the proposed EHM tool based upon the outline model; and, compiling a deployable EHM tool from the source code in a manner dependent on an intended mode of operation for said EHM tool.

According to a second aspect of the invention, there is provided a tool for creation and/or deployment of an equipment health monitoring facility as recited in claim 24.

The tool may comprise a processor, a display means and a data store. The tool may comprise a system comprising a processor, display means and a data store, any or any combination of which may be directly connected or indirectly connected via a network.

The graphical representation of the outline model may be arranged for display to a user using a display screen, projector, printer or other form of display means. Preferably the display means allows for user interaction with and/or modification of the displayed outline model so as to produce a functional model.

A test framework for the outline or functional model may be automatically generated by the tool. The tool may automatically generate a plurality of test data destinations for population by test data.

A test framework or test harness for the deployable EHM tool may be automatically generated by the tool.

The tool may comprise a code wrapper library. The tool may comprise an interface wrapper library. The tool may comprise an EHM function library in which data for populating one or more predetermined EHM functions is stored.

According to a third aspect of the invention, there is provided a data carrier comprising machine readable instructions for controlling operation of the process or tool of the first or second aspects of the invention.

Any of the optional features dependent on claim 1 or the first aspect may also be applied to the second and third aspects of the invention.

One or more working embodiments of the present invention are described in further detail below by way of example with reference to the accompanying drawings, of which.

Figure 1:
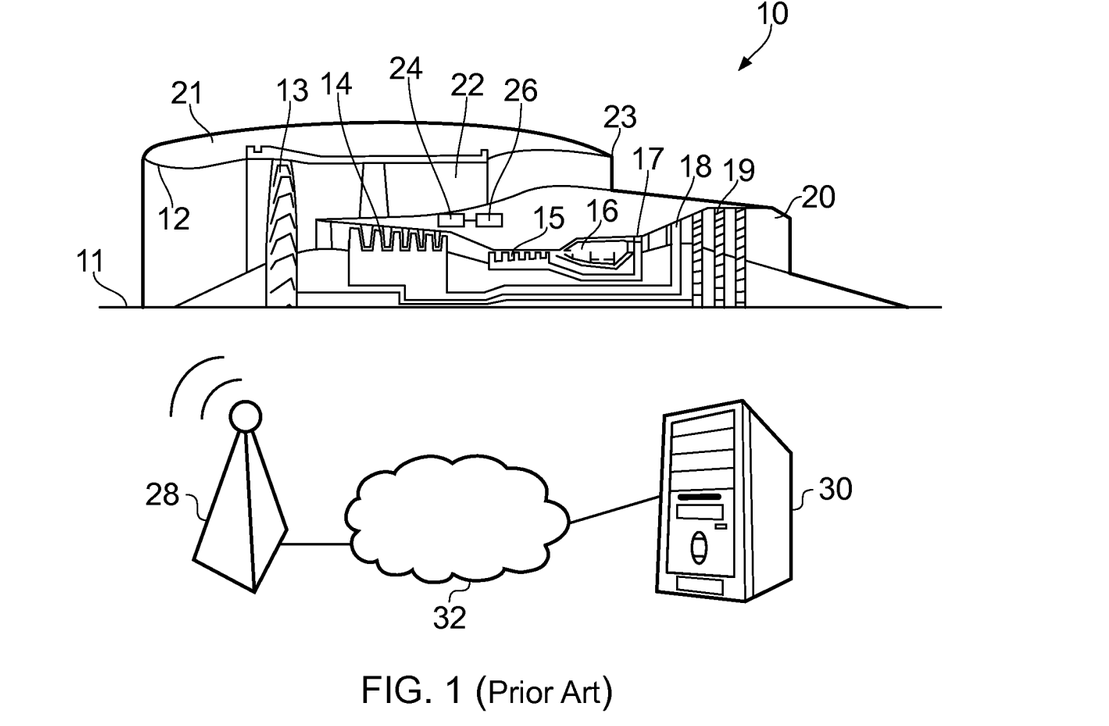
FIG. 1 shows a gas turbine engine monitoring system according to the prior art.

With reference to FIG. 1, a ducted fan gas turbine engine generally indicated at 10 has a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and a core engine exhaust nozzle 20. A nacelle 21 generally surrounds the engine 10 and defines the intake 12, a bypass duct 22 and a bypass exhaust nozzle 23.

The gas turbine engine 10 works in a conventional manner so that air entering the intake 11 is accelerated by the fan 13 to produce two air flows: a first air flow into the intermediate pressure compressor 14 and a second air flow which passes through a bypass duct 22 to provide propulsive thrust. The air flow is then compressed by the intermediate pressure compressor 14 and the high pressure compressor in turn prior to entering the combustion equipment 16 where it is mixed with fuel and the mixture combusted. The resultant hot combustion products then expand through, and thereby drive the high turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts.

The engine 10 may be fitted to an airframe, ship or other vehicle or vessel for propulsion, or to other apparatus. The arrangements being described are particularly, but not exclusively, applicable to engines which move from place to place, during normal use. Accordingly, references herein to the example engine mounted on an airframe are illustrative of one example, in the interests of brevity.

The engine 10 includes a remote communication module 24, illustrated highly schematically in FIG. 1, and accommodated at a convenient location on the engine 10. This may be within the engine core, fan-mounted, or elsewhere. The engine 10 also includes an engine monitoring unit 26 which is connected to one or more sensors or other components within the engine 10. The data connections may be based on a network technology such as ethernet or other technologies and allow the unit 26 to collect data from apparatus and functions within the engine 10 and/or an associated vehicle, to process and/or store this data for monitoring purposes.

The module 24 provides for the communication of engine operation data from the monitoring unit 26 to ground and thereby to an external or remote system such as, for example an administration, monitoring or operations centre. In this example, data is communicated over a cellular network to a base station 28 and thereby to a remote server system 30 via a network, such as the internet 32. The server system 30 is shown schematically and may designate one of a number of destinations to which engine data may be transmitted. It will be appreciated that conventional data security provisions will typically be in place for communication of data in this manner and will not be described in detail herein for conciseness.

The engine 10 and associated equipment provide one example of equipment which may be monitored according to the present invention. It will be appreciated that numerous other examples of equipment exist to which the present invention could be applied. Typically such equipment will be complex in nature and a valuable asset to an operator and may comprise, for example, electrical and/or mechanical machinery, such as engines, vehicles, power generation equipment, manufacturing or processing equipment or plants, drilling or other excavation equipment, chemical engineering equipment or plants, or the like. This list is not exhaustive and is intended to provide an indication of the potential application of the invention only.

A tool created according to the present invention may reside on or be comprised within the monitoring unit 26 and/or within the server system 30 remote of the engine 10. The tool requires data connection with the monitoring unit or another entity capable of receiving the engine operational data and processing means for processing said data. In alternative arrangements to those described above, the engine operational data may be transferred by other wired or wireless communication means such as by a wired connection to the EMU 26 or else by transfer of data using one or more conventional portable data storage means, such as a memory stick, disk or the like. The server system 30 may take a number of forms as will be described in further detail below with reference to FIG. 12.

Figure 2:
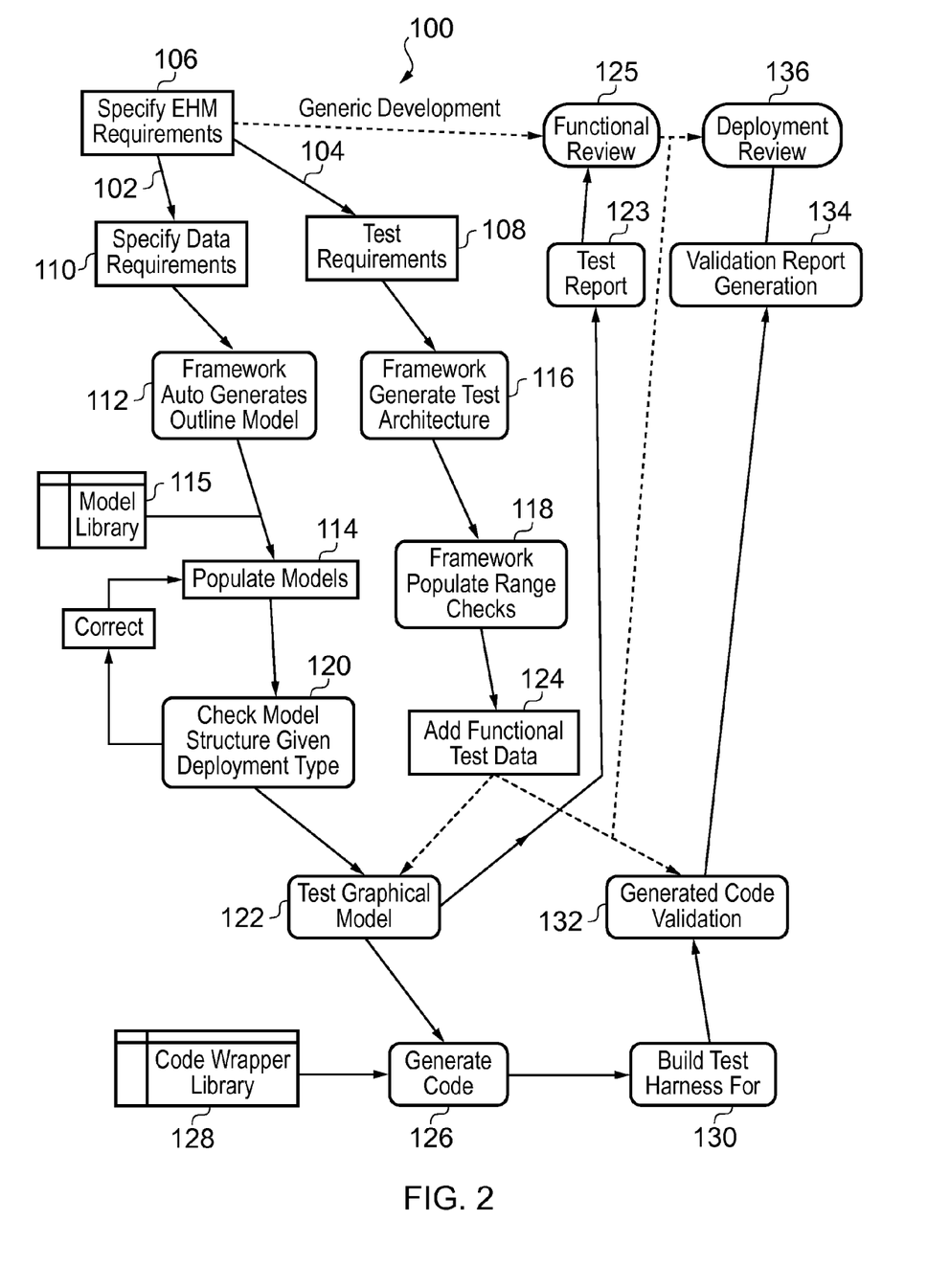
FIG. 2 shows one embodiment of a process for creating a monitoring tool according to the present invention.

Turning now to FIG. 2, there is shown a process and framework that enable development and deployment of analytical modules for the purpose of performing Equipment Health Monitoring (EHM). The process details the use of the framework through the lifecycle of developing an EHM module, in this example from the specification of the requirements through to the module testing and then deployment to production or usage environment.

EHM algorithms can cover a wide spectrum of both operational techniques and deployment techniques. Algorithms can use both high and low frequency data rates and may use data of differing formats, such as signal data from sensors, image data, and/or acoustic data. Furthermore EHM techniques and tools are becoming mission critical to the support of assets such as gas turbine engines.

The process developed as described below provides a single methodology that enables EHM algorithms to be specified and packaged to meet a variety of practical requirements. It enables algorithms to be designed, tested and then deployed to a number of different locations and for different operating modes. The combined elements of the process provided within a single structured framework allow for creation of tools in a format which is useable in high integrity environments—including real-time and/or integrated tools—as well as in remote server environments.

Methods of creating monitoring tools according to the present invention may be implemented using commercially available modelling software, such as MATLAB® SIMULINK® which is made available by The Mathworks Limited. A number of alternative modelling tools are commercially available or could be developed for the purpose of performing graphical algorithm building and auto-coding for real time systems in accordance with the present invention. Within FIG. 2, the process 100 generally comprises two primary functions, namely that of creating a deployable model and testing/checking the model to ensure functional integrity. A number testing steps may be carried out alongside model generation steps as indicated in the two paths 102 and 104 depending for the initial requirements specification stage 106.

At step 106, the process is initiated by defining the functional requirements of the EHM tool to be generated. This involves capturing the functional or physical features of the equipment to be monitored using the tool. Following this stage, a test of the format and/or completeness of the EHM requirements can be carried out at 108.

Stage 110 involves specification of the requirements of the data to be handled by the tool. The data requirements specify the data which will be used to determine the EHM requirements determined in stage 106. The data will relate to the sensor data recorded by the plurality of sensors on the engine/equipment and communicated the EHM tool.

The model structure or outline is generated automatically by the model generation tool at stage 112 based on the EHM requirements and data requirements defined in stages 106 and 110. A user then populates the model structure with model component information at 114. Test architecture for the model structure or framework is automatically generated at 116. In addition, checks are carried out on the population of the framework by the model creation tool at 118.

A model structure check is carried out by the model creation tool at 120. Criteria to be met at this stage are dependent on the intended deployment scenario for the tool. The result of this procedure may require correction of the model population stage in the form of an iterative correction loop prior to proceeding to stage 122 where testing of the complete graphical model is undertaken prior to generation of machine readable code for the EHM tool at 126 in dependence on the complete model defined in stages 106 to 120.

Functional test data resulting from testing of the tool during generation is added at stage 124. The graphical model testing 122 results in generation of a test report at 123, which may be used as part of a review of the functional requirements of the EHM tool to be generated at 125. This may comprise an interim review point in order to ensure that the tool can function as intended and that any proposed revisions can be implemented prior to coding of a deployable EHM tool.

The code generation stage 126 draws from a code wrapper library 128 such that code is generated automatically according to predetermined provisions. In addition an automated testing framework or test harness for the generated code is automatically generated at 130. The test harness comprises a collection of machine instructions and test data configured to test the EHM tool unit by running it under varying conditions and monitoring its behavior and outputs. The test harness accordingly allows for automation of testing of the tool once created and may encompass software, tools, samples of data input and output, and configurations for testing of the EHM tool. Validation of the generated EHM tool is undertaken at stage 132 by way of an automated evaluation of the tool based on the test harness to ensure that it complies with the tool requirements. A validation report is automatically generated at 134 which can be used within a deployment review process 136 prior to final deployment of the tool to a working environment.

The stages 106 to 136 of the EHM tool generation system will now be described in further detail with reference to FIGS. 3-11.

Figure 3:
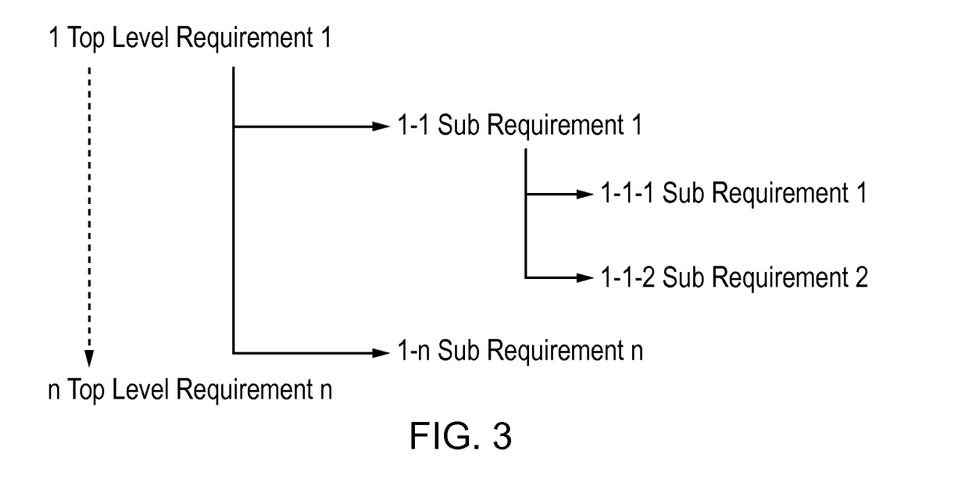
FIG. 3 shows an exemplary hierarchical structure of monitoring requirements.

Turning to FIG. 3, there is shown a structured hierarchical format for entering and/or capturing requirements of an EHM tool. The structure comprises a plurality of tiers or grading of requirements, in which a top level requirement may comprise one or more sub-tier requirements, which sub-tier requirements may comprise one or more third-tier or tertiary requirements. In this example, the third-tier requirements represent the lowest or final level of decomposition of requirements although further tiers may be provided in alternative embodiments.

A corresponding hierarchical requirement numbering or identification system is implemented by numbering each top-level requirement and subsequently identifying each sub-tier requirement by adding a suffix to the top-level identifier. A further suffix is added to denote a third tier requirement, which would accordingly take the form 'n-n-n'. The functional requirements denote the requirements of algorithms to be implemented with the EHM tool.

The requirements can be captured using standard or widely used data file formats such as, for example, extensible markup language (XML) such that a wide variety of software can be used to create the requirements for the purpose of the present invention. For example the structured requirements document could be generated using conventional word processing tools and saved in extensible markup language (xml) format.

The use of a structured hierarchical requirements specification allows for a formal definition to the specification of the EHM algorithms such that the requirements can be programmatically propagated through the algorithm build and test process as will be described below.

Figure 4:
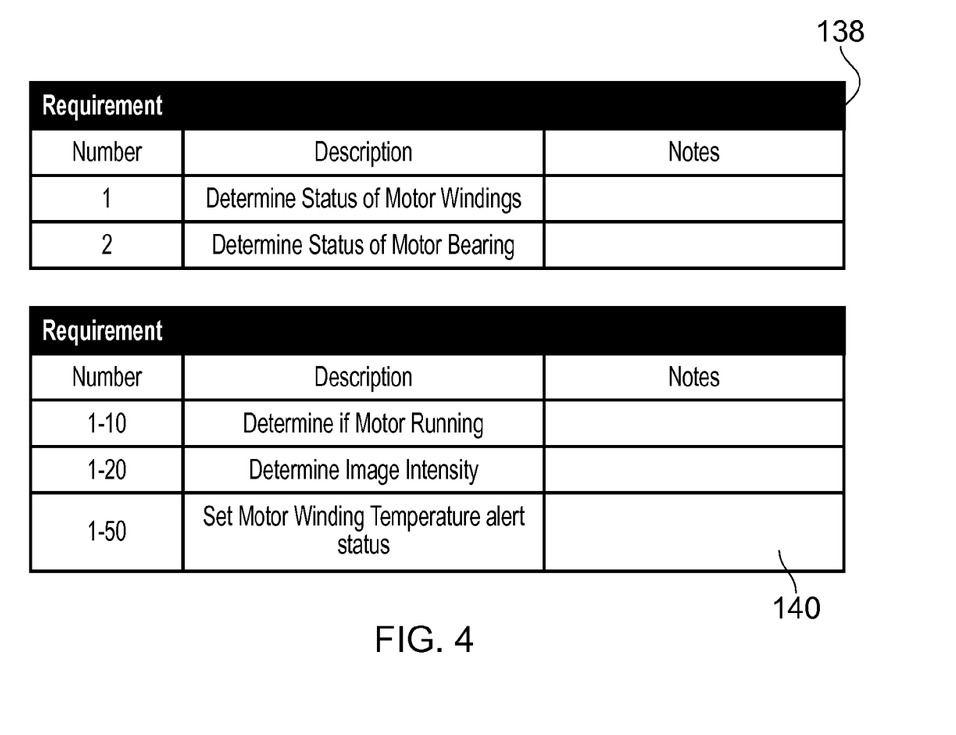
FIG. 4 shows exemplary arrays of captured monitoring requirements.

The requirements are captured in information arrays, an example of which is shown in FIG. 4. There are shown two tables 138 and 140, each being of a two-dimensional array format in which one column denotes the number or indicator for each requirement. The top level functional requirements of the gas turbine engine to be captured by the monitoring tool are given in table 138. In this example, the top level requirements relate to an electrical machine for use in conjunction with a gas turbine engine, such as a starter/generator arrangement or the like. Such requirements may be applied to other types of electrical machine. An example of the second tier requirements stemming from the first top level requirement '1' are captured in separate table 140. It will be appreciated that a series of related arrays may be created in this manner to capture and document all requirements and subordinate requirements for an EHM tool.

Figure 5:
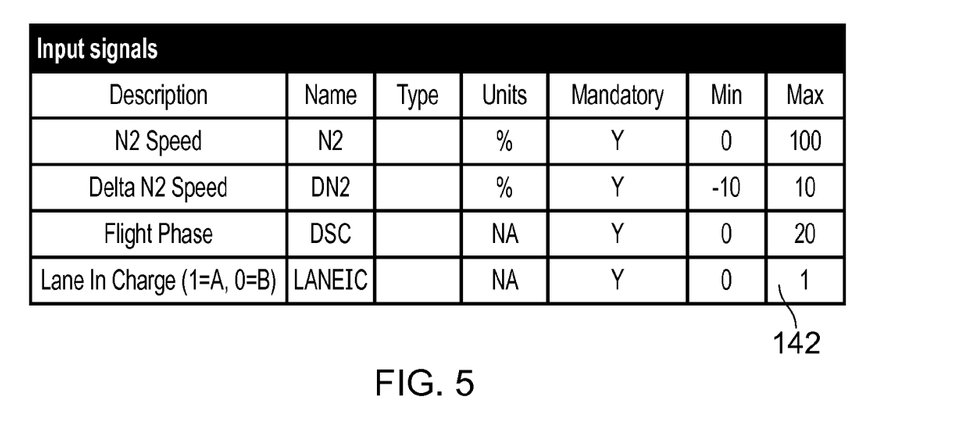
FIG. 5 shows an exemplary array of captured data modelling requirements.

Turning now to FIG. 5, an example of the capture of the specification of data requirements stage 110 is shown in array 142. The definition of the data input and output requirements is generated using the same structure and format as for the functional EHM requirements.

The data signal definition in the data requirements specifies for each signal required by the model, and for each result generated by the model: a signal name and description; a signal data type; a signal minimum range; a signal maximum range; the units associated with that signal. The definition may also specify the signal dimensions (e.g. dependent on whether the signal input is either vector or matrix) and/or an indication of the mandatory or optional nature of the signal within the tool framework.

Where data relating to an existing or known algorithm is to be captured, results from a previous calculation performed by the algorithm can be input to the model.

The input of data requirements in this manner allows the definition of any shape or type of data. Specification of signal attributes allows validation of signal quality to be embedded in the model structure as will be described below.

Using a system and method according to the present invention, models for a wide variety of EHM techniques can be developed within a common framework, for example techniques ranging from signal computational methods to frequency domain methods or imaging methods.

Once the EHM and data specifications have been captured, EHM development provides for automated generation of an outline algorithm model. This is achieved by reading the entries in the requirements and data specifications, for example from the XML documents described above, and then creating an outline model according to a model template, which includes requirement entities for each requirement defined in the specification.

The outline model is displayed as a graphical representation comprising representations of inputs, processing or decision blocks, outputs and links there-between. The interfaces therein and signal checking functionality are generated automatically. A graphical representation of the template is shown in FIG. 6, which includes requirement entity blocks generated automatically for the top level requirements of FIG. 4.

Figure 6:
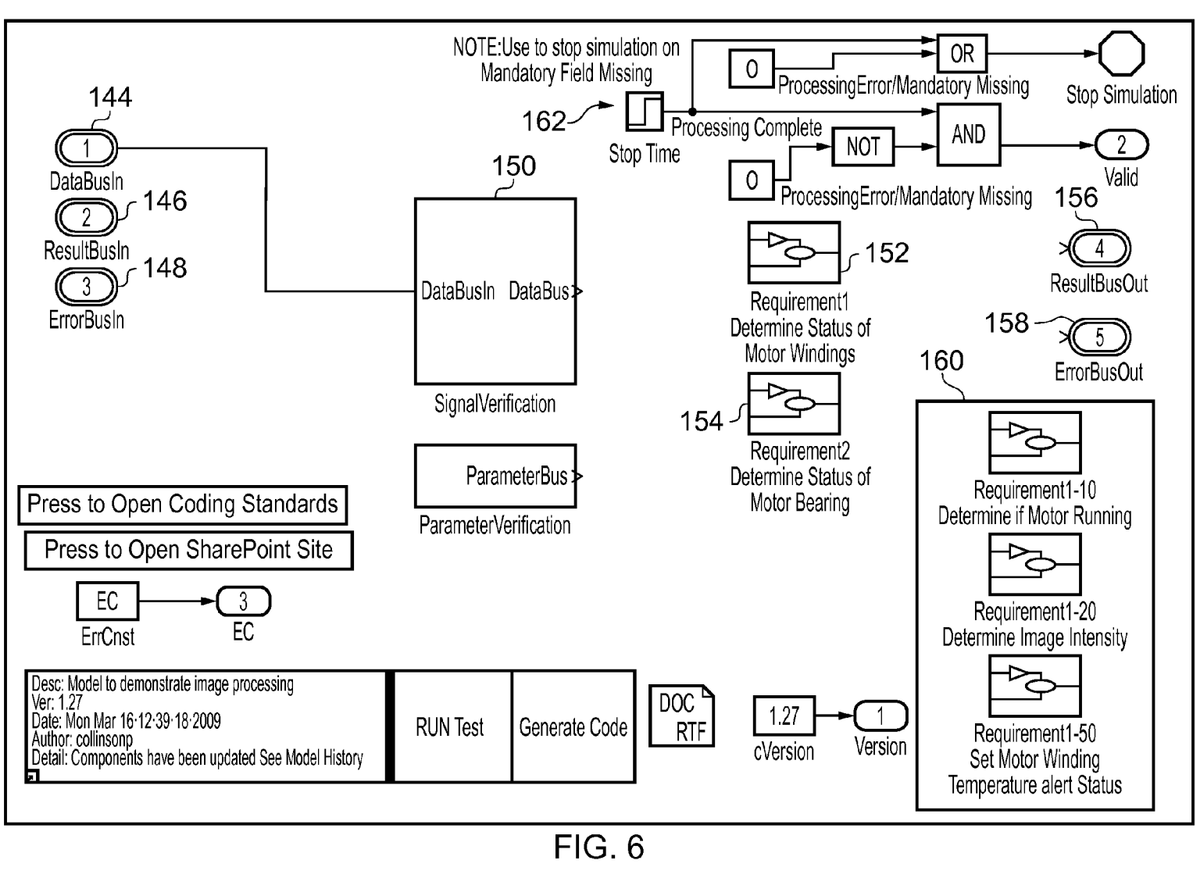
FIG. 6 shows an automatically generated model structure representation according to one embodiment of the present invention.

All the models created using the EHM development tool comprise the same key features:

three input structures, labelled DataBusIn 144, ResultBusIn 146 and ErrorBusIn 148 in the example of FIG. 6, to ensure common model input architecture;

a signal verification block 150 to determine if the input data signals are within valid range;

model requirement blocks 152 and 154 that act as place holders for completion of the model functions as will be described below; and, two output structures ResultBusOut 156 and ErrorBusOut 158 to ensure common model output architecture.

For clarity within the present example, the sub-level requirements which are subordinate to the requirement 'Determine Status of Motor Windings' 152 are shown as blocks in window 160. Each of those blocks is representative of one of requirements 1-10, 1-20 and 1-50 listed in the second-tier table 140 of FIG. 4.

This input format remains the same for all deployment options through use of corresponding input structures 144, 146 and 148. A model definition class is created and stored externally of the model itself and defines all the signal data attributes. This enables tailoring of the build to the deployment platform required via the model definition class, whilst allowing a generic or common model to be constructed for any potential deployment scenario.

The automated creation of requirement blocks 152, 154 ensures the tracking of particular requirements through a model and that the functionality of a particular requirement has been implemented. This serves to avoid any oversights at this stage of the model creation, which can cause significant complications if they are not realised until later in the development process.

Standard logic steps for determining whether or not processing of the data within the model template can be determined valid is also shown within the graphical representation at 162. Such a validity check network is also implemented automatically upon generation of the model according to the template. Accordingly, if a data signal indicated as being mandatory in the data requirements specification stage 110 is missing in the determination, then the output will be considered to be invalid during use of the tool and the simulation would be halted. A similar result would also occur if a processing error had occurred. The validity check is used for ensuring quality of data is retained throughout use of the EHM tool. This is achieved by defining both a value and a quality attribute with respect to each data signal to be used within the tool. Those attributes are used to ensure that the validity of signals can be propagated through all calculations.

Figure 7:
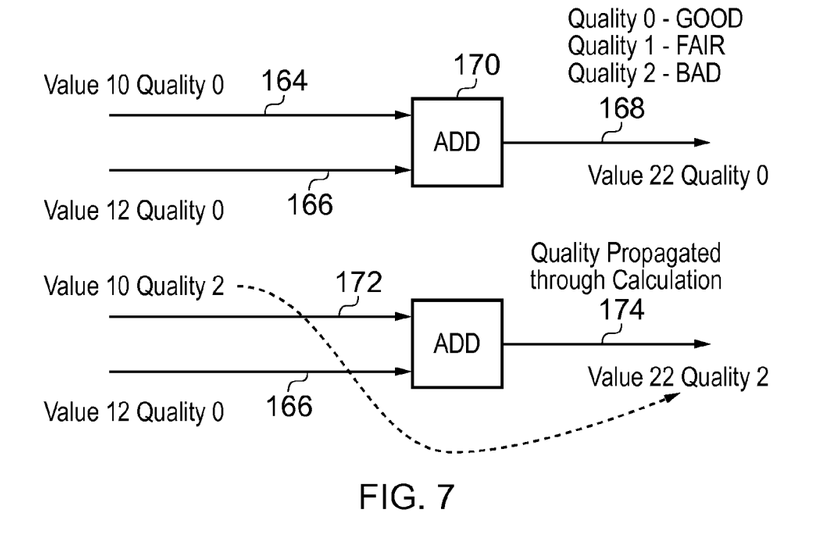
FIG. 7 shows two schematic examples of quality propagation through model processes.

The quality of data can be either input or determined within the model, and then can be propagated through all subsequent calculations using or derived from the particular signal. In FIG. 7 there is shown an example of how quality attributes can be tracked and propagated throughout use of the EHM tool. In the upper example of FIG. 7, two data signals 164 and 166 are combined in order to achieve an output 168. Input 164 has value '10' and a quality '0'. Input 166 has value '12' and quality '0'. When inputs 164 and 166 are combined at step 170, they result in output 168 having value '22' and quality '0'.

In this example, the standard input qualities are GOOD (0), FORCED (1) and BAD (2) and are assigned the values shown in brackets. The determination of the quality or a calculation will be to examine the maximum value of quality (i.e. indicative of the worst quality attribute of the inputs) for all the inputs and to assign that value to the output. Thus in the upper example of FIG. 7, the output quality is GOOD. However in the lower example of FIG. 7, one input, 172, has a BAD quality attribute, denoted by numeral '2'. Thus, when inputs 172 and 166 are combined, they result in a BAD output quality attribute on output 174. Such an attribute would be output if either or both inputs had a BAD quality attribute.

Turning now to stage 114 in FIG. 2, once the model outline or template has been generated at 112, the model is required to be populated and/or otherwise manipulated in order to result in a working graphical model. The present invention allows for automatic population of requirement container fields within the model by referring back to corresponding information captured in the specification stages.

The functionality of the model is controlled manually in this example. However it will be appreciated that known graphical development environments comprise standard built-in methods for simplifying such steps using user-interaction with the graphical interface. This embodiment also provides for a model library 115 in which previously-developed custom blocks for standard EHM functionality are stored for subsequent access and incorporation in to a model template. These library blocks are designed for use in the framework and have quality tracking inherent in the design. Accordingly, a user can select a number of such custom functionality blocks for insertion into the model in order to simplify the population stage.

The use of such library blocks ensures standard functions are made generic while ensuring that they follow the rigid format for implementation within the model framework. It is to be noted that all library 115 components are intended to be revision tracked in the model under development and stored as part of the model history. This ensures complete traceability of library components used in the model lifecycle.

At stage 120 in FIG. 2, the model structure is checked against criteria dependent on the intended deployment environment for the EHM tool. This ensures that the model conforms to the coding and layout standards for a given deployment scenario as shown by way of example in FIGS. 12A-C. Although the model is inherently independent of the intended deployment at this stage, some models that are intended for high integrity remote operation may require additional signal validation to ensure the transmission of the data has maintained the requisite data integrity. Additional checks can be run at this phase to ensure these additional measures have been added to the model, such as conformance to coding standards and/or checks to ensure the model incorporates certain blocks required for high integrity applications. Again, these checks are automated upon selection of an intended deployment type. Conversely, the checks may be performed for all known deployment conditions automatically and the determination of the suitability for particular deployments—or identified problems therewith—may be reported back to the user.

Figure 10:
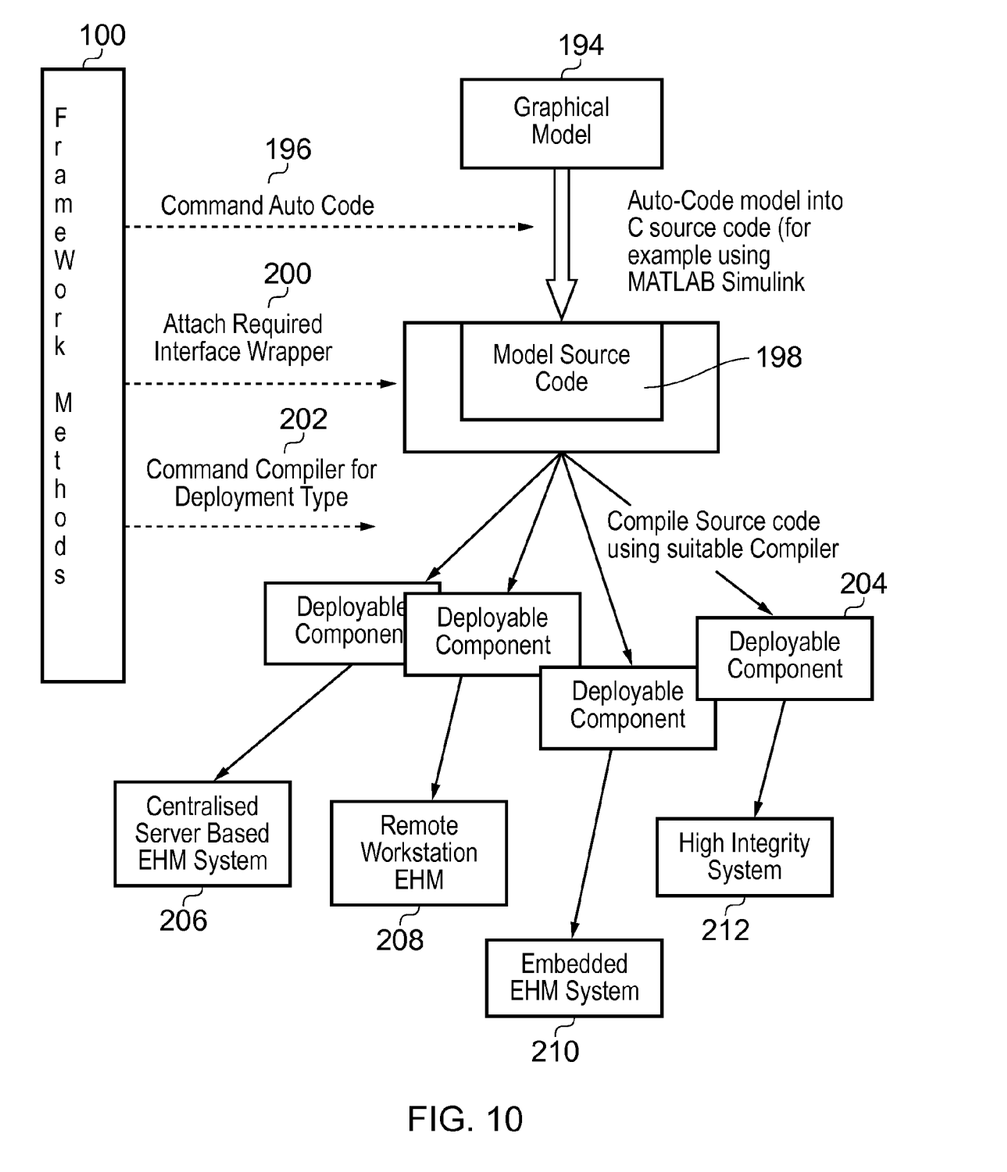
FIG. 10 shows one embodiment of a process for deploying a monitoring tool according to the present invention.

In FIG. 10, there is shown an example of a populated graphical model in which the template components have been integrated and interlinked into a visually connected graphical model. Accordingly, the requirement block 152A has been populated and connected to inputs 144A and 146A such that the signal verification steps 150A and processing validation 162A have been accommodated in determining results and error outputs 156A and 158A. However it will be appreciated that the details of links within the graphical model and the population of the blocks will vary from algorithm to algorithm. A test specification may be created and implemented as described below.

At stage 108 definitions of the testing requirements for the model are determined and entered by a user in the same predetermined structure and format as described above in relation to the functional requirements (see FIGS. 3 and 4). For each requirement, a set of tests must be documented to ensure that the requirement is fully validated. The tests are designed to fit into one of four test categories as follows:

Performance Tests—Test timeliness of algorithm performance (these are typically applied only to high level requirements or the model as a whole)

Functional Tests—Tests to ensure algorithms perform correct processing

Exception tests—Tests to ensure algorithms handle any invalid data inputs

Range Checks—Checking of algorithms with signals at the edge of their ranges (these are typically applied only to high level requirements or the model as a whole).

The definition and use of such a test structure ensures traceability from design requirements through to the test cases. Each requirement may therefore have associated therewith a test, which is defined in a hierarchical structure which matches that of the structure in which the requirements are captured.

Once the testing requirements have been determined at 108, a test methodology can be implemented in an automated fashion by defining a test architecture at stage 116. The framework process uses assertion style testing. For each test defined in the test requirements at 108, a set of input data must be provided to exercise the different models states required by the test. Similarly, a set of expected result values must be provided that can be asserted for equality with the model generated results. Based on the test requirements for the test methodology, input at 108, the development tool will generate the test structure in terms of file directories and individual files ready to be populated with either input data or expected result data. The format of such files is shown schematically in FIG. 9. As with the model template generation, this ensures that individual test files are created for all tests defined in the test specification ensuring traceability through the tests to the requirements.

The system will automatically populate test cases for range tests where each test value is assigned a value which is either within or outside of the defined range. Thus a value may be assigned which is: marginally below a minimum range value; marginally above a minimum range value; marginally below maximum range; or marginally above maximum range. This ensures that the model can handle and suitably process out-of-range values in a predictable manner. This also serves to remove some of the time-consuming activity of manually configuring tests whilst ensuring the model is fully tested.

Figure 8:
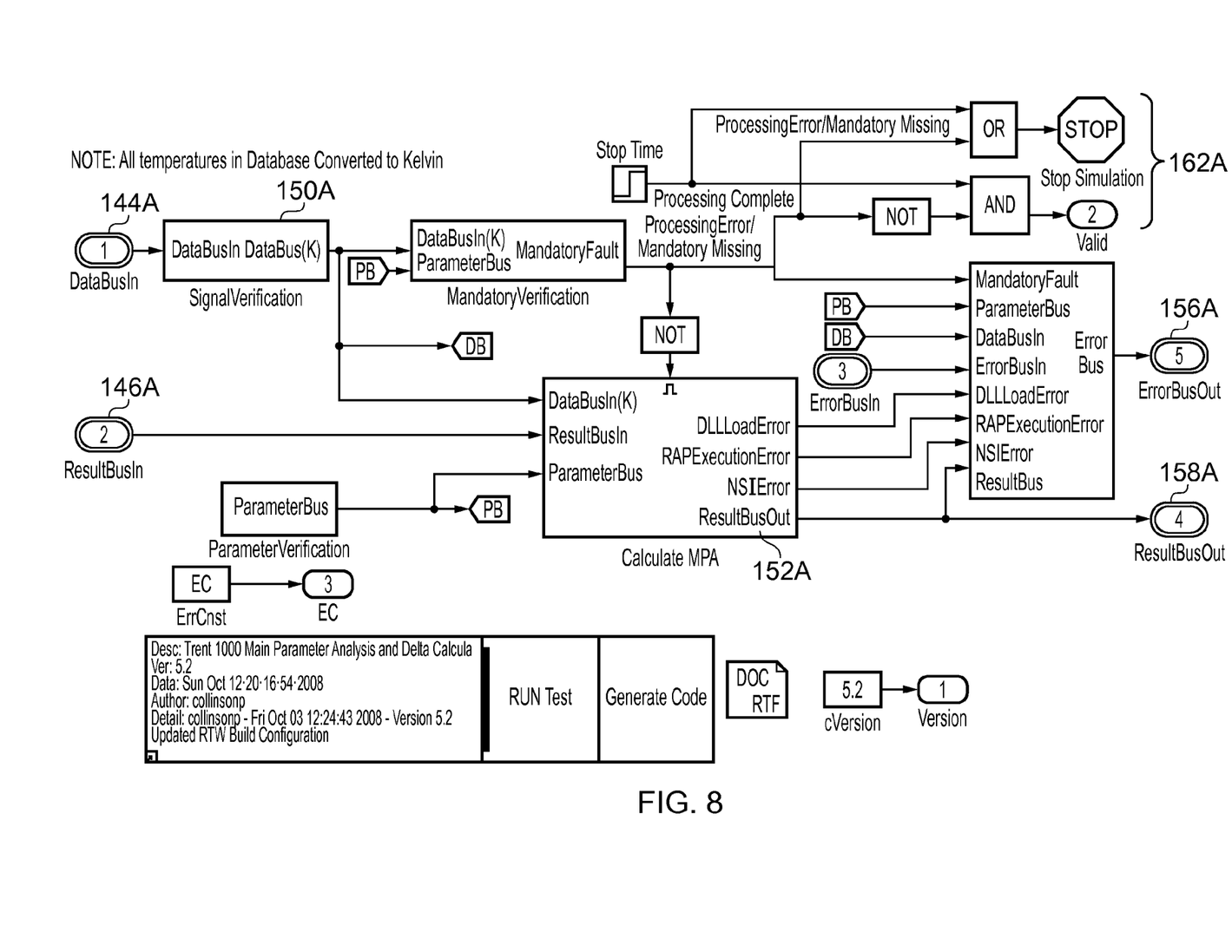
FIG. 8 shows an example of model structure representation once populated according to one embodiment of the present invention.
Figure 9:
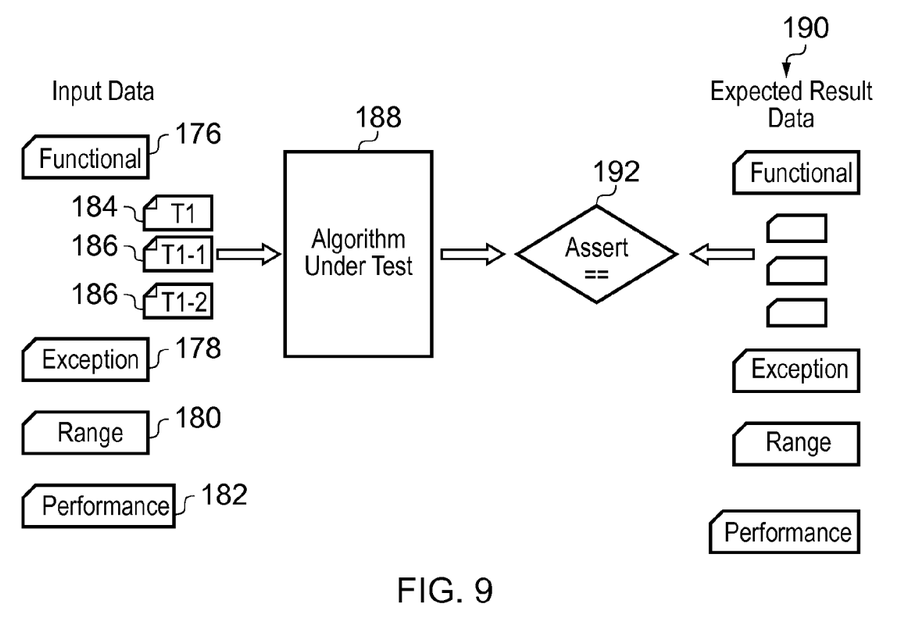
FIG. 9 shows a schematic representation of the model framework test methodology.

As shown in FIG. 8, data to be input for conducting testing comprises functional 176, exception 178, range 180 and/or performance 182 test data. In this example, the functional test data comprises individual entries or sets of data suitable for conducting a top-level test 184 as well as all the sub-tier tests 186 there-under according to the tiered structure of the requirements under test.

When such test data is run through the algorithm under test 188, the outcome 190 is compared against the predetermined expected results data 190 at step 192 in order to determine whether the algorithm has performed as predicted. This system allows tests to be run either individually or as a complete batch.

Testing of the graphical model at stage 122 is then undertaken in an automated, scripted fashion by processing all the test cases and reviewing the actual test results to ensure that they are equivalent to the expected results, which have been recorded as expected result data 190. A test report is automatically produced at stage 123 detailing all the test case results for inspection as part of a functional review 125 by the developer. A report is produced that details not only the results of the tests, but also full model revision history and configuration data for all library components used in the model.

Once a graphical model is deemed suitable for coding, (i.e. at stage 126 of FIG. 2) graphical coding tool development is employed for real time code development that allows autocoding of the graphical models. This stage calls upon a code wrapper library 128 in which standard coding for given graphical model arrangements is automatically implemented. This may be achieved by assigning individual elements of code or else modules of codes dependent on the functions being coded. For an EHM tool which is to be generated as an iterative improvement of an earlier tool, a significant percentage of code may mimic that of an earlier iteration.

The code wrapper provides the interface between the algorithm code generated by the graphical coding tool and the systems trying to pass data to be processed by the model. This abstraction of the data interface ensures that the algorithm code can be generic and not tailored towards a specific deployment option. The interface wrapper ensures that, given the different ways data is supplied to the model, (e.g. in a batch or in a real time stream) the algorithm is presented with the data correctly and the results are made available in the required format.

The library 128 thus comprises a plurality of code wrappers, each being specific to a particular deployment type. Such wrappers comprise a standard batch deployment wrapper, a real-time deployment wrapper and a batch high-integrity deployment wrapper. The correct wrapper for the intended tool deployment type is added to the algorithm code to provide the interface to the calling system. For the batch wrapper algorithm code can then be automatically generated from the established graphical model.

The code is ready for testing and compiling as a deployable tool as will be described below.

One important benefit of the approach described herein is that the model source will be the same for each deployment type (with the possible exception of high integrity systems where additional model data integrity checks may be required). Instead, the development/building process used herein attaches interface wrappers to the coded model dependant upon the required operational environment.

This process is shown in FIG. 10, in which the tested graphical model 194 is automatically coded in C source code using the tools in the available development environment at step 196. Other programming languages may be used in alternative embodiments. The resultant model source code 198 is ready to be applied to a particular operation environment by application of an interface wrapper thereto at stage 200. The form of the interface wrapper will thus depend on the operational environment selected by the developer from a list of available options. These interface wrappers are derived from a standard set of interfaces stored in a library.

The combined source code and interface wrapper are then compiled according to the deployment scenario selected at step 202 under the instruction of the development tool. In the present embodiment, this yields a deployable component 204 which is useable in one of four operational environments, namely a centralised server-based EHM system 206; a remote workstation EHM 208; an embedded EHM system 210; or a high integrity system 212. Steps 200 and 202 can then be repeated for other operational environments if one or more alternative deployments of the model source code is required.

Thus models can be generated using a single unitary process and methodology for all EHM applications and the end operational environment does not need to be known before the model is built. The location of the model can be very simply changed if required. Additionally, the same designer can be used to generate EHM algorithms for the complete range of locations that EHM applications are deployed.

Figure 11:
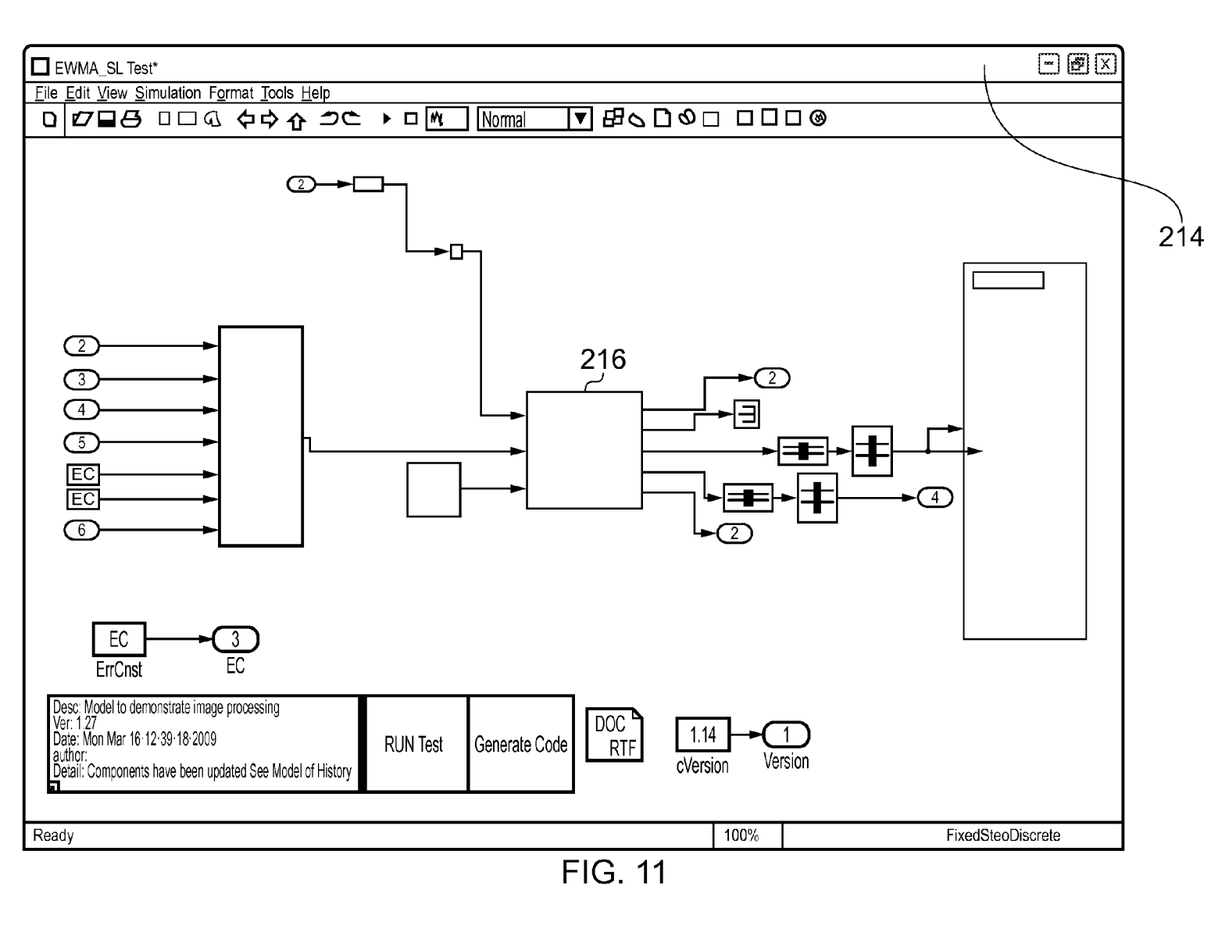
FIG. 11 shows a schematic of a deployable model component test harness within the model development environment; and, FIGS. 12A to 12C show examples of systems in which the model according to the present invention may be deployed.

Once the code has been generated, the tool proceeds to prepare for validation of the model component by generating a test harness (at stage 130 in FIG. 2) that allows the deployable component to be tested in the same development environment as the original model. An example of the development environment 214 comprising the deployable component 216 is shown in FIG. 11. The test cases for the source model can then be applied to the compiled component to ensure results from both the compiled component and the source models are equal.

Exactly the same assertion tests that were used for the source model can be used for the compiled model. There is no need to create any new files although additional or alternative testing procedures may be implemented to meet specific criteria as necessary.

Using the test harness described above, the components are validated using all the test cases and a pass off or validation report is generated automatically at stage 134 upon successful completion. The report details the model history, the configuration status of library components used in the model; and, detail of all tests executed and the results thereof.

Although the scope of the invention is with regard to the process of generating and testing EHM models for deployment, below are provided details the potential system requirements for the model management process. The model manager will be dependant upon the deployment location and type but essentially will be responsible for compiling data to be passed to the model and read and distributing results calculated by the model. FIG. 12 shows various block diagrams of model manager functionality dependent on different deployment regimes.

Figure 12A:
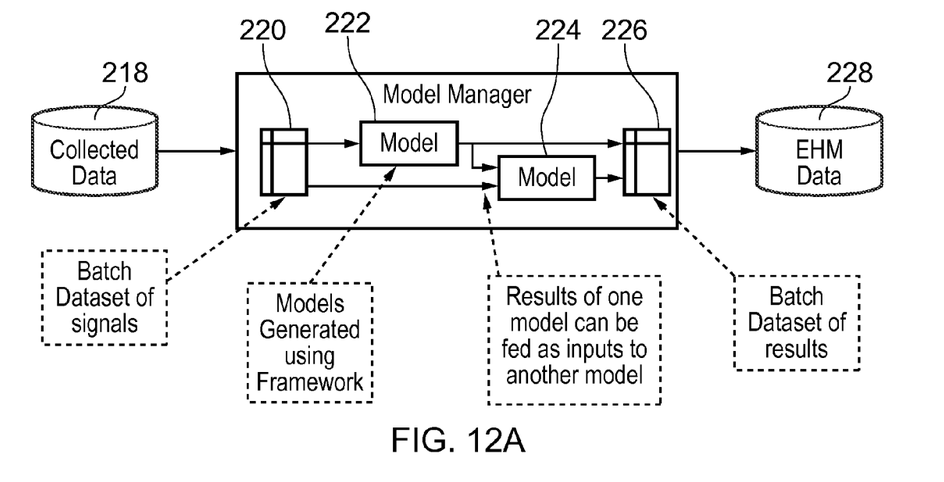

FIG. 12A shows a remote batch or scheduled system in which a tool developed according to the present invention may operate. In FIG. 12A, the data 218 collected and stored during operation of the gas turbine engine—or other monitored equipment—is processed or sorted into a batch dataset 220 of signals which are required by the EHM tool. The dataset 220 is made available to the EHM tool models 222 and/or 224 created according to the present invention. It is to be noted that the results of one model can be fed into another model if required and all results are collected as a batch dataset of EHM model results 226. The results can then be stored as EHM data 228 and communicated or disseminated as necessary for review by relevant parties or for further processing to determine necessary equipment inspection, maintenance, servicing, repair, overhaul or other proactive or reactive steps.

Figure 12B:
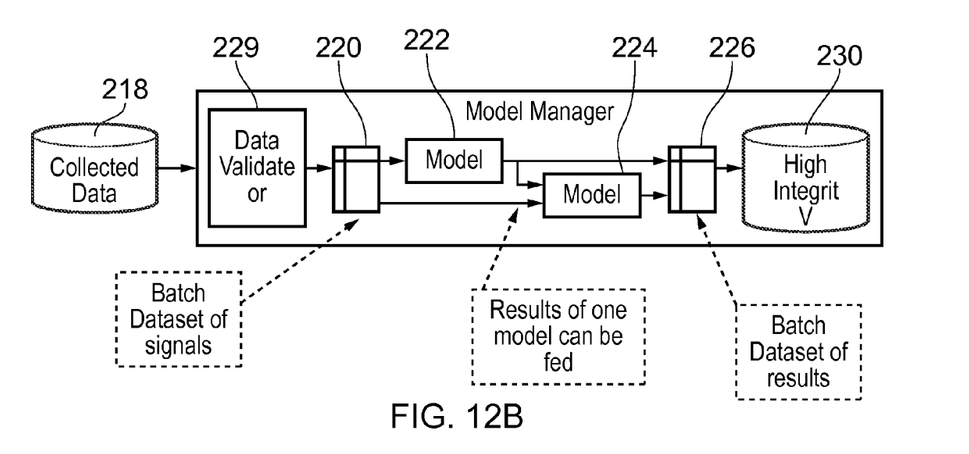

By way of comparison, in FIG. 12B, there is shown a high integrity system for remote batch or scheduled EHM applications. Like numerals are used to denote like features in FIG. 12A. However in this application, the model manager is required to conduct additional validation steps 229 prior to creating one or more batch datasets of signals 220 for processing by the EHM tool models. Additionally, the resultant high integrity EHM data 230 is stored, accessed and managed within the control of the model manager.

Figure 12C:
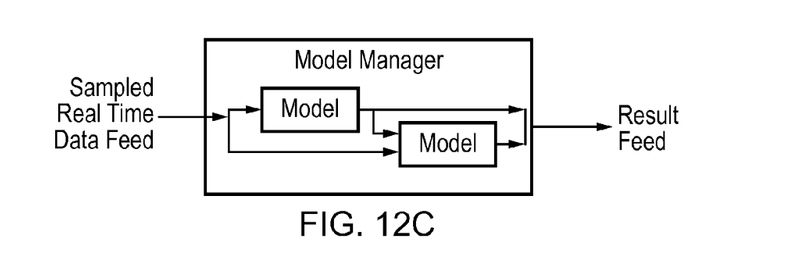

In FIG. 12C, there is shown an example of a real time, potentially integrated, system, in which a real time data feed is sampled, prior to reception by the model manager, which allows direct processing of the sampled data by the EHM tool models. The EHM results data is fed directly from the model manager without the additional input and output processing shown in FIGS. 12A and 12B. In view of those various operational environments, the development of a tool in accordance with the present invention offers the advantages that: algorithms can be located at the source from data capture in an embedded system or else can be run in a server based back office system; algorithms can be run continually or provided with batch data to be run on a scheduled basis; and algorithms can operate under a high integrity rating to the relevant industry standard.

Further advantages offered by way of the present invention may include:

the use of library components for common functions including data validation algorithms for high integrity systems;

the use of a common tool build framework or process with ability to select interface format dependant upon deployment location;

the integrated testing of all requirements for the deployable module—including generation of test procedure and test data files or folders for running automated test scripts;

allowing algorithm development to be progressed by a developer without need for bespoke software engineering skills or need to understand the final deployment for the algorithm;

provision of a rigorous development process to ensure accuracy whilst allowing rapid adaption to changing requirements and asset conditions; and, creation of a robust system which can handle bad or missing data but continue to produce results where possible.

Any EHM facility or models, model components, source code, code modules, interface wrapper or testing framework therefor can be stored in an associated library or other form of data store for subsequent retrieval thereof and/or reference thereto when creating one or more subsequent EHM facilities.

The invention claimed is:

1. A process for creation of an equipment health monitoring (EHM) tool, comprising:
providing definition of functional requirements for a proposed EHM tool in a structured hierarchical format;

generating an outline model for a plurality of functions of the proposed EHM tool according to a model template, wherein the outline model is captured as one or more graphical representations, each graphical representation automatically including at least one component representative of a defined EHM functional requirement;

generating source code for the proposed EHM tool based upon the graphically represented model; and, compiling and executing a deployable EHM tool from the source code by applying a compilation strategy dependent on an intended mode of operation for said EHM tool.

2. A process according to claim 1, wherein the model template defines a fixed format of inputs and outputs which is common to all generated outline models.

3. A process according to claim 1, wherein the model template defines a signal verification function which is common to all generated outline models.

4. A process according to claim 1, wherein the model template defines a signal processing validation function which is common to all generated outline models.

5. A process according to claim 1, comprising populating the outline model with reference to a library of predetermined model function components.

6. A process according to claim 1, wherein the outline model is populated and/or manipulated to create a functional model and the generating of source code is automated based upon the functional model.

7. A process according to claim 6, wherein the outline model graphical representation provides an interface by which an operator can manipulate the outline model in order to create the functional model.

8. A process according to claim 1, comprising a plurality of predetermined compilation strategies, each predetermined compilation strategy being specific to an intended mode of operation of the EHM tool, wherein one compilation strategy is selected and applied based upon a selected mode of operation of the EHM tool.

9. A process according to claim 8, wherein each mode of operation is dependent on a deployment environment for the EHM tool.

10. A process according to claim 1, comprising applying an interface wrapper after generating the source code therefore.

11. A process according to claim 10, wherein the interface wrapper is selected and applied according to an intended mode of operation or deployment environment of the EHM tool.

12. A process according to claim 1, wherein the intended mode of operation is selected from one of a high integrity EHM system, an embedded EHM system, a remote workstation EHM system, or a server based EHM system.

13. A process according to claim 1, wherein the structured hierarchical format of the functional requirements comprises a plurality of tiers, in which a top level functional requirements may have one or more subordinate functional requirements associated therewith.

14. A process according to claim 13, wherein an identifier is applied to said functional requirements, said identifier denoting the tier of the functional requirement and higher tier functional requirements, for which said functional requirement is subordinate.

15. A process according to claim 1, comprising capturing data signal requirements for said proposed EHM tool in a structured hierarchical format.

16. A process according to claim 15, wherein the data signal requirement format is the same as the format used for the functional requirements.

17. A process according to claim 15, wherein the generated outline model assigns a quality attribute to one or more input or output data signals within the model.

18. A process according to claim 17, wherein the model template comprises means for propagating said quality attribute through the generated outline model.

19. A process according to claim 1, wherein the outline model is populated and/or manipulated to create a functional model, and comprising automatically generating a functional model test framework.

20. A process according to claim 1 wherein generation of source code or compilation of the deployable EHM tool automatically instigates generation of a test framework for the deployable EHM tool.

21. A process according to claim 19, wherein the functional model test framework comprises a plurality of file directories and/or files created according to the structured hierarchical format of said functional requirements.

22. A process according to claim 19, wherein one or more test criteria values for said test framework are populated automatically based upon the EHM tool functional requirements or data signal requirements.

23. A process according to claim 19, wherein the test framework comprises a capability for generating testing or validation reports.

24. A tool for development of an equipment health monitoring (EHM) facility comprising:

one or more processors arranged to provide a structured hierarchical format for definition of functional requirements for a proposed EHM facility;

said processor arranged to generate an outline model for a plurality of functions of the proposed EHM tool according to a model template and said structured functional requirements, the outline model being captured as one or more graphical representations for display to a user, each graphical representation automatically including at least one component representative of a defined EHM functional requirement;

wherein said processor generates source code for the proposed EHM facility based upon the graphically represented model; and, compiles a deployable EHM facility from the source code by applying a compilation strategy dependent on an intended mode of operation for said EHM facility.

25. A non-transitory computer readable media comprising machine readable instructions for controlling one or more processors to:

provide a structured hierarchical format for definition of functional requirements for a proposed EHM facility;

generate an outline model for a plurality of functions of the proposed EHM tool according to a model template and said structured functional requirements, display the outline model to a user as one or more graphical representations, each graphical representation automatically including at least one component representative of a defined EHM functional requirement;

generate source code for the proposed EHM facility based upon the graphically represented model; and, compile a deployable EHM facility from the source code by applying a compilation strategy dependent on an intended mode of operation for said EHM facility.

* * * * *